United States Patent

[11] 3,554,365

| [72] | Inventor | Zoltan E. Zilahy<br>Nutley, N.J. |
|---|---|---|
| [21] | Appl. No. | 776,543 |
| [22] | Filed | Nov. 18, 1968 |
| [45] | Patented | Jan. 12, 1971 |
| [73] | Assignee | Standard Tool & Manufacturing Company<br>a corporation of New Jersey |

[54] MECHANICALLY DRIVEN TRANSFER SYSTEM
7 Claims, 7 Drawing Figs.

| [52] | U.S. Cl. | 198/232 |
|---|---|---|
| [51] | Int. Cl. | B65g 43/00 |
| [50] | Field of Search | 198/218,<br>221, 19, 135, 232 |

[56] References Cited
UNITED STATES PATENTS
3,099,348  7/1963  Algatt.......................... 198/218

*Primary Examiner*—Richard E. Aegerter
*Attorney*—Harness, Dickey & Pierce

ABSTRACT: A transfer system has pallets which are advanced in a horizontal path containing a plurality of work performing stations by a drive which simultaneously moves the pallets from one station to another by continuously driven intermittent drive which provides dwell time during which the machine operations are performed.

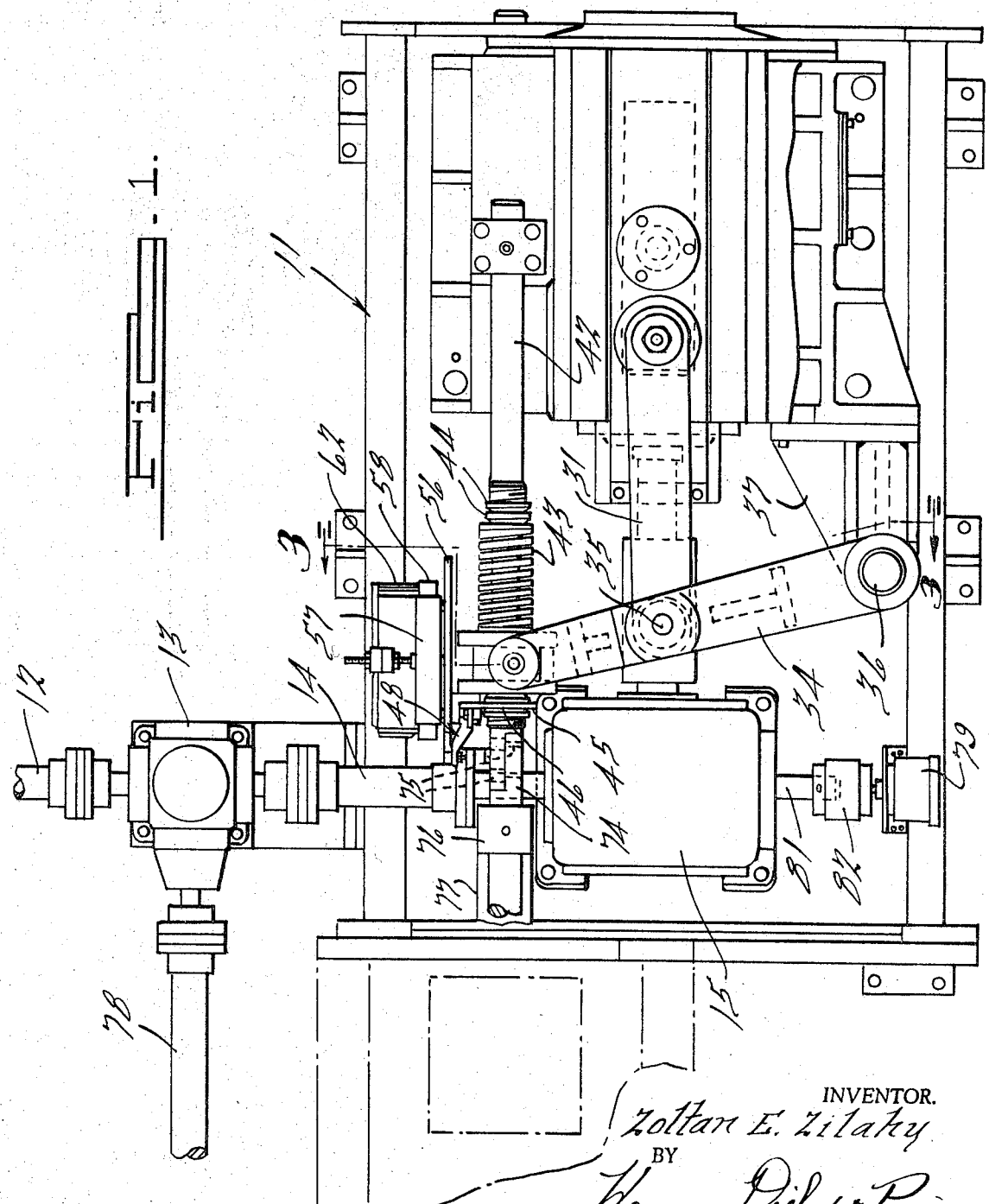

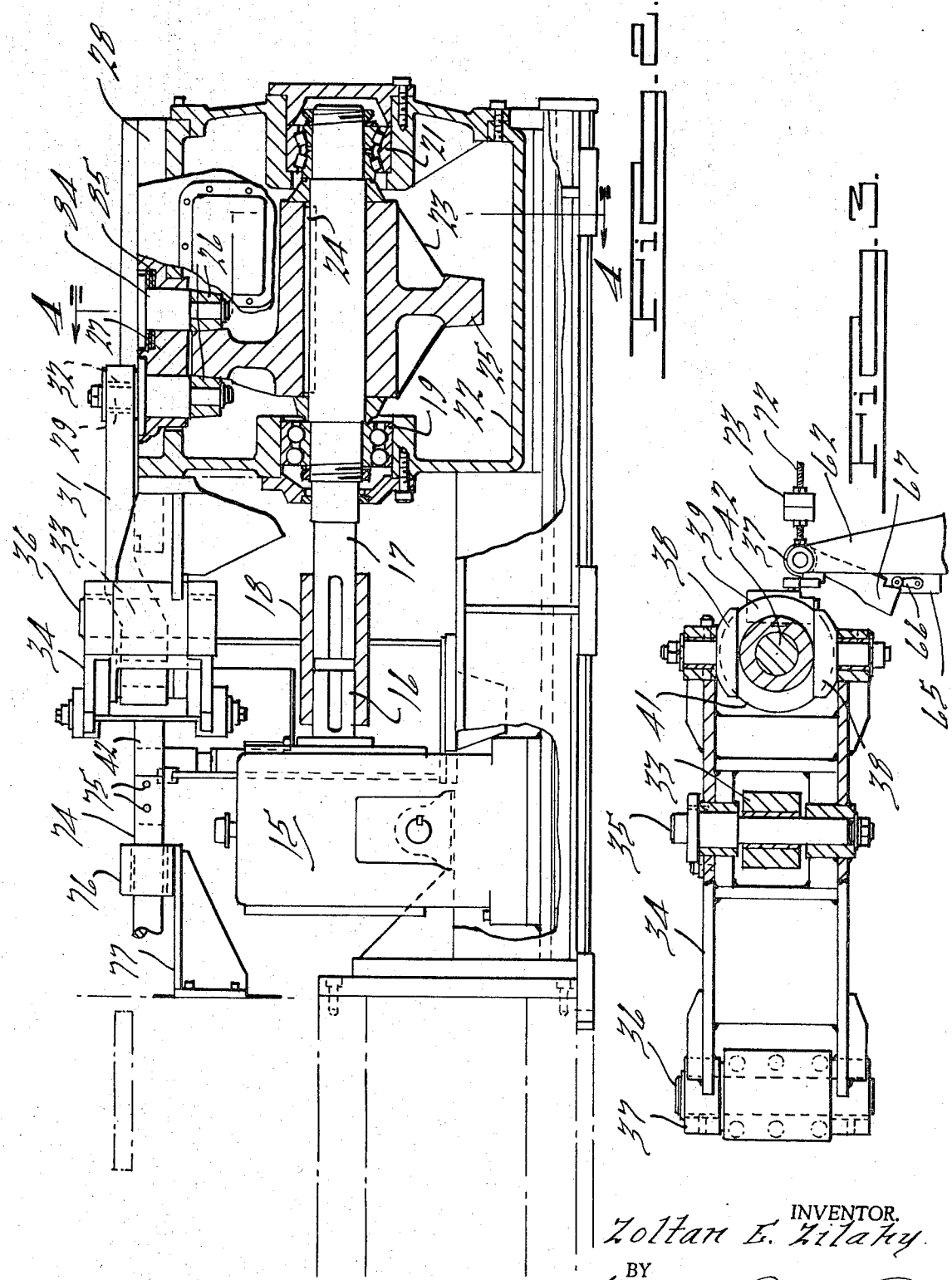

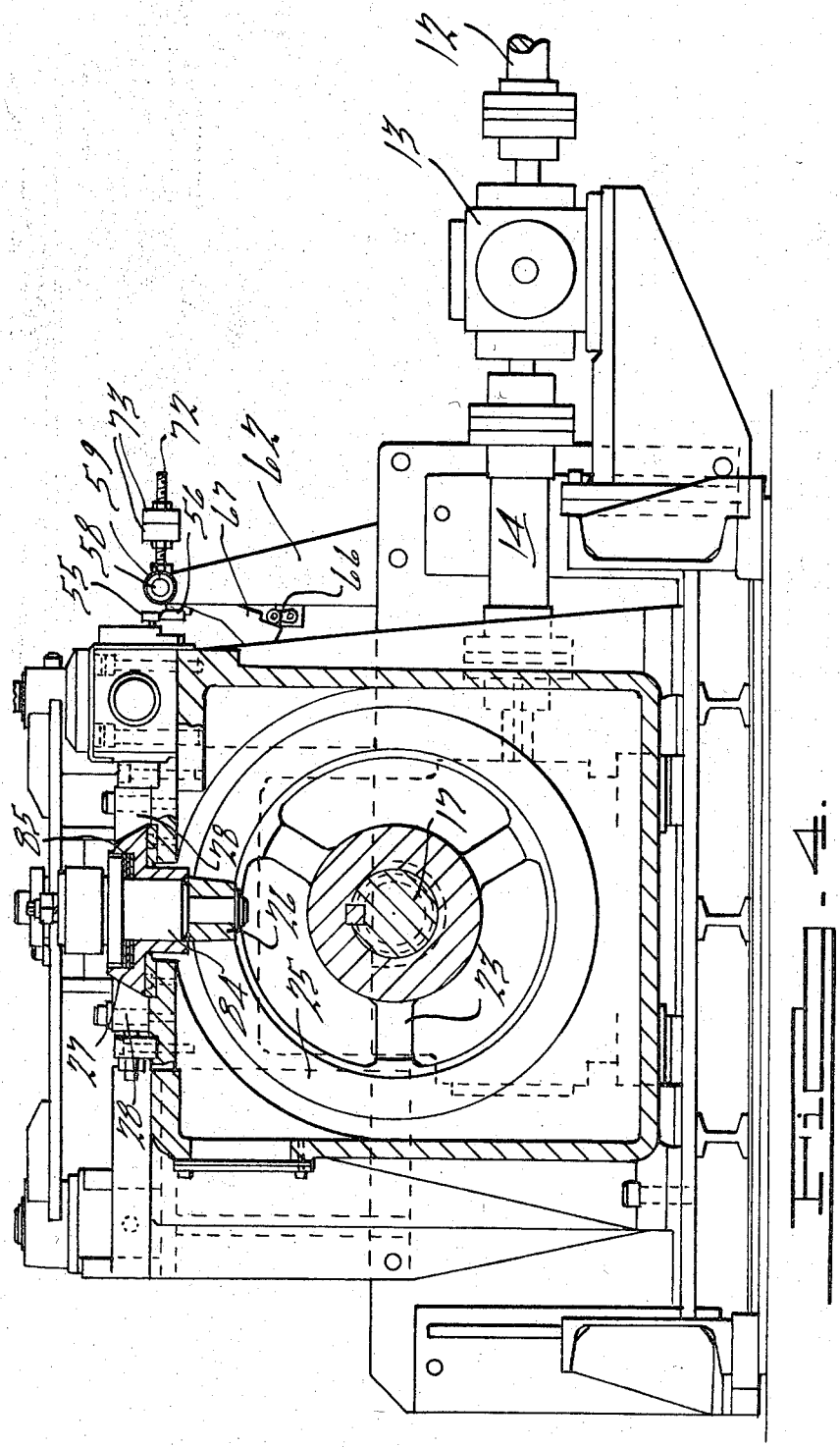

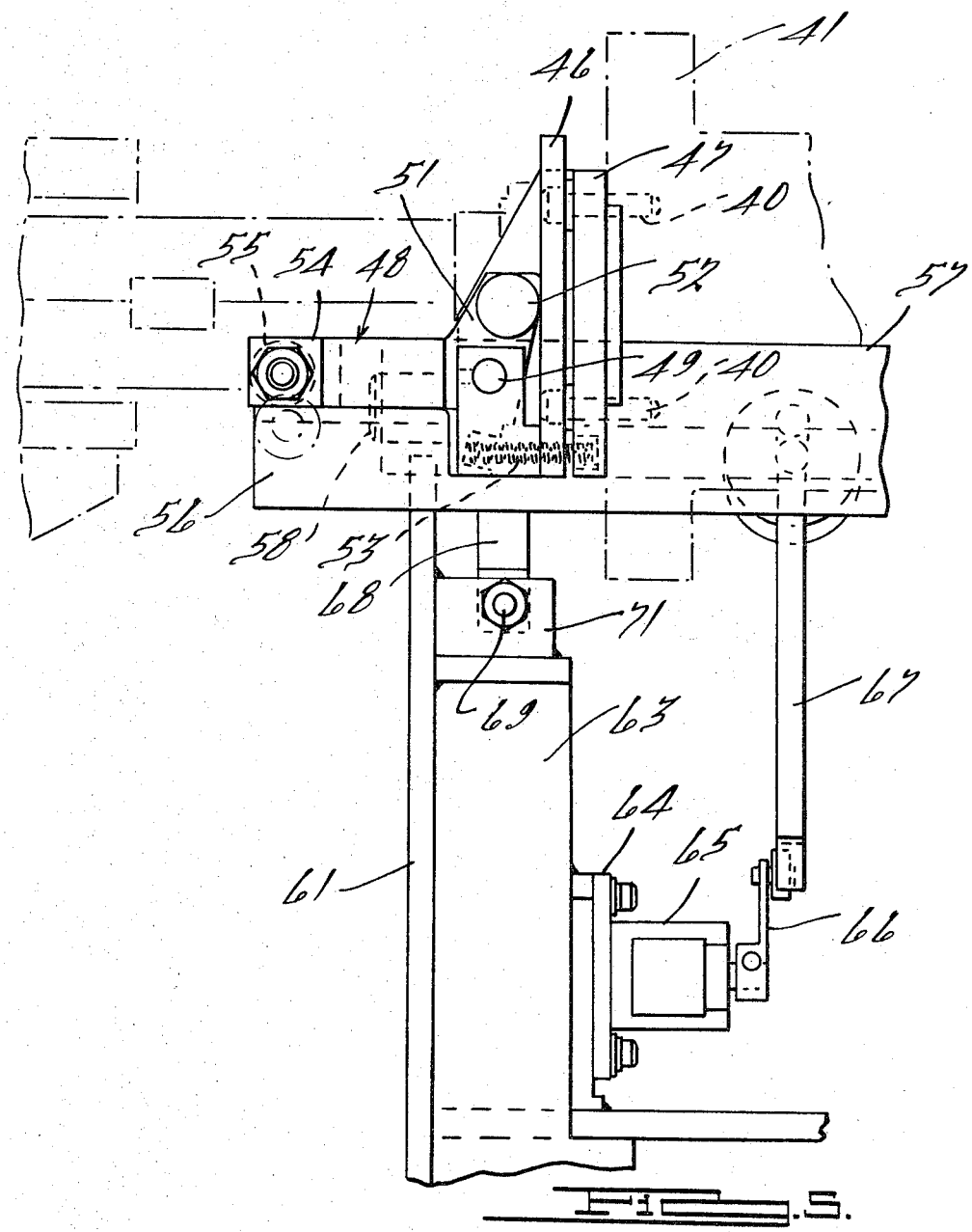

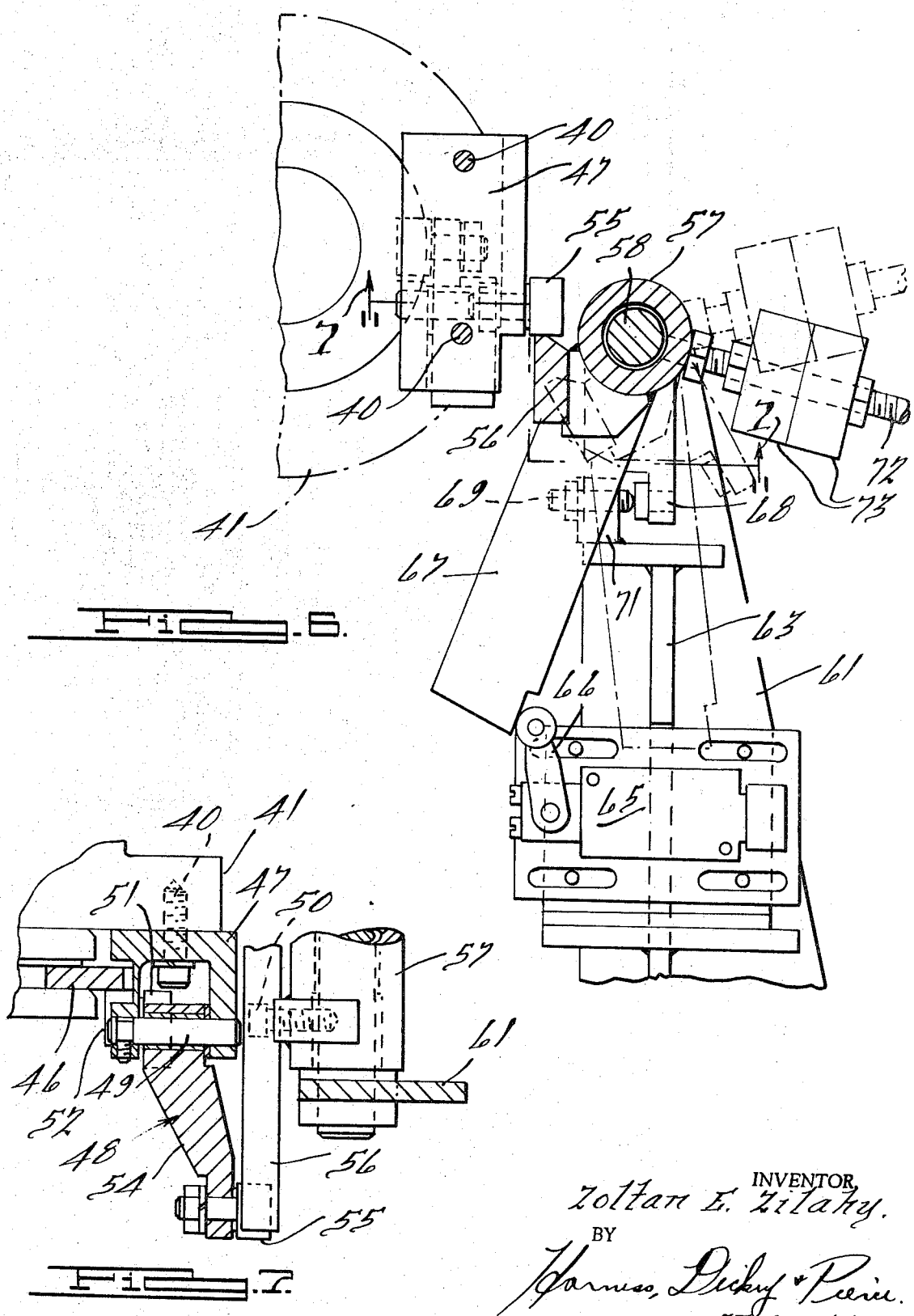

3,554,365

MECHANICALLY DRIVEN TRANSFER SYSTEM

BACKGROUND OF THE INVENTION

Reference may be had to applicants assignee's patent No. 3,271,840 to show a palletized machine in which pallets are advanced to the stations at which machine operations are performed.

SUMMARY OF THE INVENTION

The invention pertains to a drive which besides advancing pallets from the finishing station around a horizontally return path also advances the pallets from station-to-station simultaneously with dwell time therebetween. A rod is employed having aligned projections which, when extended vertically, will engage the rear end of the pallets which are advanced by the rod from one station to the next. Upon a 90° rotation of the rod the pins will be horizontally disposed and the rod is then retracted. The drive operates a cam which moves a carriage having a pivoted link connected to a pivoted lever joined to the rod to produce its advancement and retraction. The lever is held by a spring against a shoulder on the rod and should the rod be held against movement the spring will be compressed and the movement of the lever away from the shoulder on the rod will cause a switch to be operated and the drive interrupted. The cam is continuously driven and substantially a third thereof produces the transfer of the pallets while the remaining two-thirds provides dwell time for the performance of the machine operations at the stations, the clamping and unclamping of the pallets and the retraction of the rod.

BRIEF DESCRIPTION OF THE DRAWINGS

FIG. 1 is a broken plan view of a drive for the transfer system embodying features of the present invention;

FIG. 2 is a bottom view of the structure illustrated in FIG. 1, with parts shown in section;

FIG. 3 is a sectional view of the structure illustrated in FIG. 1, taken on the line 3–3 thereof;

FIG. 4 is a sectional view of the structure illustrated in FIG. 2, taken on the line 4–4 thereof;

FIG. 5 is an enlarged broken view of the structure illustrated in FIG. 3, as viewed from the right-hand side thereof;

FIG. 6 is a view of the structure illustrated in FIG. 5, as viewed from the right-hand side thereof; and FIG. 7 is a sectional view of the structure illustrated in FIG. 6, taken on the line 7–7 thereof.

DESCRIPTION OF THE PREFERRED EMBODIMENT

An intermittent drive mechanism 11 is driven by a shaft 12 which drives through a takeoff coupling 13 and a shaft 14 to a right-angle drive box 15. A shaft 16 from the drive box 15 is connected by a coupling 18 to a shaft 17 which is supported by bearings 19 and 21 within a housing 22. A cam 23 is secured by a key 24 to the shaft 17 having a cam ring 25 extending between rollers 26 which are secured to a carriage 27. The carriage rides in a pair of ways 28 and has a stud 29 on which a link 31 is pivoted on a sleeve bearing 32. The link 31 has an outer end offset at 33 and is secured to a bifurcated lever 34 by a pivot pin 35. The lever 34 is secured by a pivot 36 to a boss 37 on the housing 22. The opposite end of the lever has a pair of fingers 38 pivoted thereto which are oppositely disposed when extending within a slot 39 in a spool 41. The spool is slidable on a shaft 42 against a spring 43 which is adjustably secured thereon by nuts 44. The spring is of a heavy type and urges the spool against a pair of nuts 45 on the forward end of the shaft 42 between which a washer 46 is secured.

The cam 23 is driven continuously and is so constructed as to rotate once in a predetermined number of seconds depending upon the type of machine and the work to be performed at the stations. For the present machine, the cam rotates once in three seconds, one-third of this time is required for advancing the pallets, the other two-thirds providing dwell time during which the carriage 27 is returned, the machining operations performed and the pallets clamped and released at the stations.

Since something could happen during the machine operation which would prevent the pallet from moving, a device is provided which stops the operation of the machine should the spool 41 compress the spring 43 without moving the shaft 42. As illustrated in FIGS. 5, 6 and 7, the spool 41 has a bracket 47 secured thereto by screws 40. The bracket supports a bellcrank link 48 secured thereto by a pivot 49. One arm 51 of the link 48 carries a roller 52 which engages the washer 46 when the link is urged clockwise by a spring 53. The other arm 54 of the link 48 carries a roller 55 above a bar 56 which is secured to a sleeve 57 by screws 50. The sleeve 57 is pivoted on a shaft 58 mounted in bosses 59 on supports 61 and 62. The support 61 has a T-shaped bracket 63 on which a plate 64 is laterally adjustable. The plate carries a switch 65 having an operating arm 66 thereon. A switch operating arm 67 is secured to the sleeve 57 which is limited in its clockwise movement by an arm 68 which abuts an adjustable screw 69 on a boss 71 secured to the top of the T-shaped bracket 63. The sleeve 57 carries a threaded screw 72 having weights 73 threaded thereon for counterbalancing the sleeve 57 and the bar 56 and for urging the arm 68 into stop position for locating the bar 56 and the arm 67 in normal operating position.

The end of the shaft 42 is connected to the pallet advancing bar 74 by screws 75. When an overload on the bar resists its movement, the spool 41 will compress the spring 43 and advance the link 48 therewith. Since the roller 52 is in contact with the washer 46, the link 48 will be rotated counterclockwise moving the roller 52 downwardly and moving the bar 56 downwardly therewith to rotate the sleeve 57 counterclockwise and advance the arm 67 to actuate the switch arm 66. This interrupts the operation of the motor and stops the operation of the machine before any damage can occur to the mechanism thereof or to the tool performing the work operation.

The advancing bar 74 is journaled in a sleeve bearing in a boss 76 secured to a bracket 77. A shaft 78 driven by the takeoff coupling 13 advances the end pallet onto a rearwardly extending convenor after the last machining operation has been performed on the workpiece located thereon. A plugging switch 79 is driven by an extension 81 of the drive shaft 12 connected thereto by a loose coupling 82 for the purpose of braking and stopping the shaft and cutting off the motor drive thereto should the drive be restricted at any point therein. The pin 35 is preferably of the eccentric type so that it may be turned to change the position of the lever at the end of its full stroke so that the advancement of the pallets may be accurately adjusted. It will be noted that the rollers 26 which contact the cam ring 25 are mounted on flanged pins 84, one of which has shim washers 85 thereon, one or more of which may be added from time to time to advance the roller 26 and maintain a tight engagement between the cam ring 25 and the two rollers 26.

I claim:

1. In a mechanically driven transfer device, an axially shiftable bar to be pulled, a housing, a shaft bearinged in said housing, a cam on said shaft having a cam ring, a carriage on said housing having a pair of rollers engaging opposite sides of said cam ring, a lever pivoted on said housing for pulling said bar, a link on said carriage for actuating said lever, and means for continuously driving said cam.

2. In a mechanically driven transfer device as recited in claim 1, wherein a pivot connects said link to said lever interjacent its ends, a pair of fingers on the end of the lever opposite to the pivoted end, a spool slidable on said bar and engaged by said fingers, a stop on said bar, and a spring on said bar urging said spool against said stop.

3. In a mechanically driven transfer device as recited in claim 2, wherein a tiltable lever is carried by said spool, and means on the tiltable lever engageable with the stop on said bar for tilting the tiltable lever when the spool compresses said spring.

4. In a mechanically driven transfer device as recited in claim 3, wherein means are actuated upon the tilting of the tiltable lever for interrupting the operation of the machine.

5. In a mechanically driven transfer device as recited in claim 2, wherein said pivot connecting said lever and link is of the eccentric type for accurately locating said bar at the end of the pulling operation.

6. In a mechanically driven transfer device, an axially shiftable bar to be pulled, a housing, a shaft bearing in said housing, a cam on said shaft, a carriage movably mounted on said housing actuated in reciprocation by said cam, a slidable member on said bar, lever means carried by said slidable member and secured to said carriage for pulling said bar, and a spring between said slidable member and the adjacent end of the bar through which the pulling force on the bar is applied by said slidable member.

7. In a mechanically driven transfer device as recited in claim 6, wherein a switch on said device is actuated to stop the machine operation, a switch operated mechanism carried by said slidable member, and a stop member on said bar for actuating said switch operating mechanism when the slidable member moves on said bar away from said stop member when compressing said spring.